(12) United States Patent  (10) Patent No.: US 8,376,544 B2
Porter  (45) Date of Patent: Feb. 19, 2013

(54) EXTENDABLE EYEGLASSES AND METHOD OF USE

(75) Inventor: David R. Porter, St. Louis, MO (US)

(73) Assignee: PorterVision, Inc., St. Louis, MO (US)

( * ) Notice: Subject to any disclaimer, the term of this patent is extended or adjusted under 35 U.S.C. 154(b) by 208 days.

(21) Appl. No.: 12/979,084

(22) Filed: Dec. 27, 2010

(65) Prior Publication Data

US 2012/0162597 A1    Jun. 28, 2012

(51) Int. Cl.
  *G02C 5/08* (2006.01)
(52) U.S. Cl. .......................................... 351/63
(58) Field of Classification Search ............ 351/41, 351/47, 48, 57, 58, 63, 124–135, 158
  See application file for complete search history.

(56) References Cited

U.S. PATENT DOCUMENTS

| | | | |
|---|---|---|---|
| 1,899,664 A | 2/1933 | Blocker | |
| 3,361,514 A | 1/1968 | Davis | |
| 4,707,088 A * | 11/1987 | Tabacchi | 351/56 |
| 4,840,476 A | 6/1989 | Rooney | |
| 5,448,317 A * | 9/1995 | Huang | 351/63 |
| 5,937,681 A | 8/1999 | Myhr et al. | |
| 6,315,408 B1 * | 11/2001 | Huang | 351/128 |
| 6,406,144 B1 | 6/2002 | Waters | |
| 6,709,127 B2 | 3/2004 | Lu | |
| D492,712 S | 7/2004 | Holmes et al. | |
| 6,783,236 B2 * | 8/2004 | Chou | 351/63 |
| 7,399,077 B2 | 7/2008 | McDermott | |
| 7,455,402 B2 | 11/2008 | Gerber et al. | |
| 7,651,217 B2 * | 1/2010 | Welchel et al. | 351/115 |
| 2004/0032652 A1 | 2/2004 | Holmes et al. | |
| 2005/0253998 A1 | 11/2005 | McDermott | |
| 2008/0002143 A1 | 1/2008 | McDermott | |
| 2010/0073625 A1 | 3/2010 | Engstrom | |
| 2010/0073626 A1 | 3/2010 | Engstrom | |

* cited by examiner

*Primary Examiner* — Scott J Sugarman
*Assistant Examiner* — Vipin Patel
(74) *Attorney, Agent, or Firm* — Thompson Coburn LLP

(57) ABSTRACT

An eyeglass apparatus comprises first and second eyeglass portions, each having a connector portion and a lens portion. The eyeglass apparatus is configured to transition between stowed and extended configurations. When the eyeglass apparatus is in the stowed configuration, the lens portions overlie one another. When the eyeglass apparatus is in the extended configuration the lens portions are in a non-overlying configuration.

15 Claims, 13 Drawing Sheets

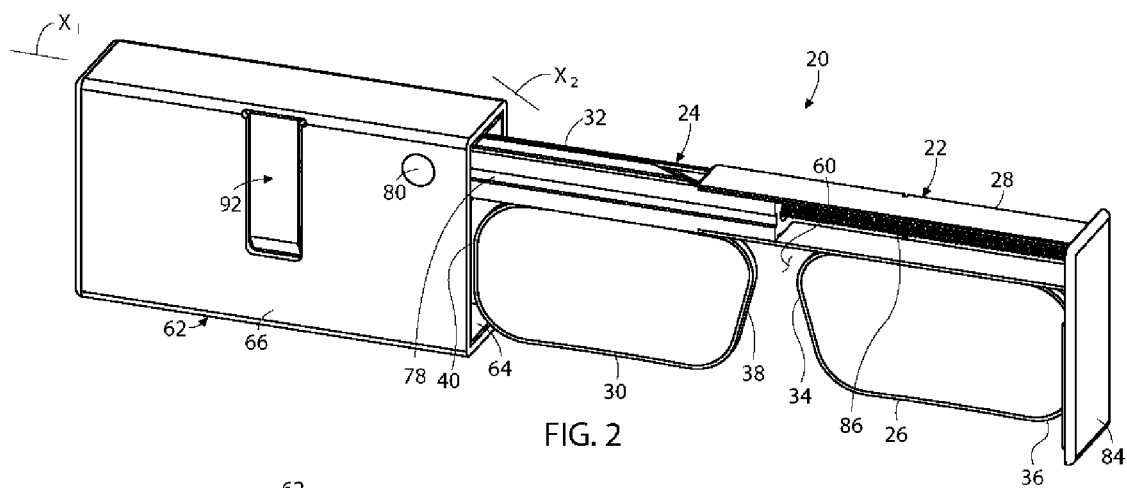
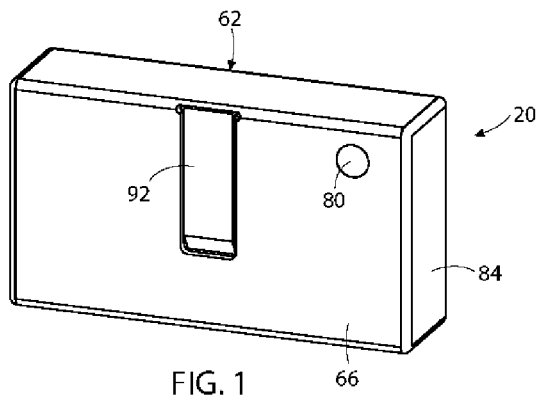

EXTENDABLE EYEGLASSES AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to eyeglasses, and more particularly to extendable eyeglasses.

2. General Background

People who use eyeglasses for only certain activities (e.g., reading) often keep their eyeglasses in their pockets, carrying bags or purses. Conventional eyeglasses are relatively bulky and may become damaged.

SUMMARY OF THE INVENTION

Generally, an eyeglass apparatus of the present invention comprises a first eyeglass portion and a second eyeglass portion. The first eyeglass portion comprises a first lens portion and a first connector portion operatively coupled to the first lens portion. The second eyeglass portion comprises a second lens portion and a second connector portion operatively coupled to the second lens portion. Each of the first and second lens portions includes a medial edge portion and a lateral edge portion. The first and second connector portions are mechanically connected to one another in a manner permitting the eyeglass apparatus to transition between a stowed configuration and an extended configuration. The first and second connector portions are connected together in a manner such that when the eyeglass apparatus is in the stowed configuration the first and second lens portions overlie one another. The medial edge portion of the first lens portion is closer to the lateral edge portion of the second lens portion than to the medial edge portion of the second lens portion when the eyeglass apparatus is in the stowed configuration. The lateral edge portion of the first lens portion is closer to the medial edge portion of the second lens portion than to the lateral edge portion of the second lens portion when the eyeglass apparatus is in the stowed configuration. The first and second connector portions are connected together in a manner such that when the eyeglass apparatus is in the extended configuration the first and second lens portions are in a non-overlying configuration with the medial edge portions of the first and second lens portions being between the lateral edge portion of the first lens portion and the lateral edge portion of the second lens portion.

Further features and advantages of the present invention, as well as the operation of the invention, are described in detail below with reference to the accompanying drawings.

BRIEF DESCRIPTION OF THE DRAWINGS

FIG. 1 is a perspective view of an embodiment of an eyeglass apparatus of the present invention in a stowed configuration.

FIG. 2 is a perspective view of the eyeglass apparatus of FIG. 1 in an extended configuration.

Figure 3A:
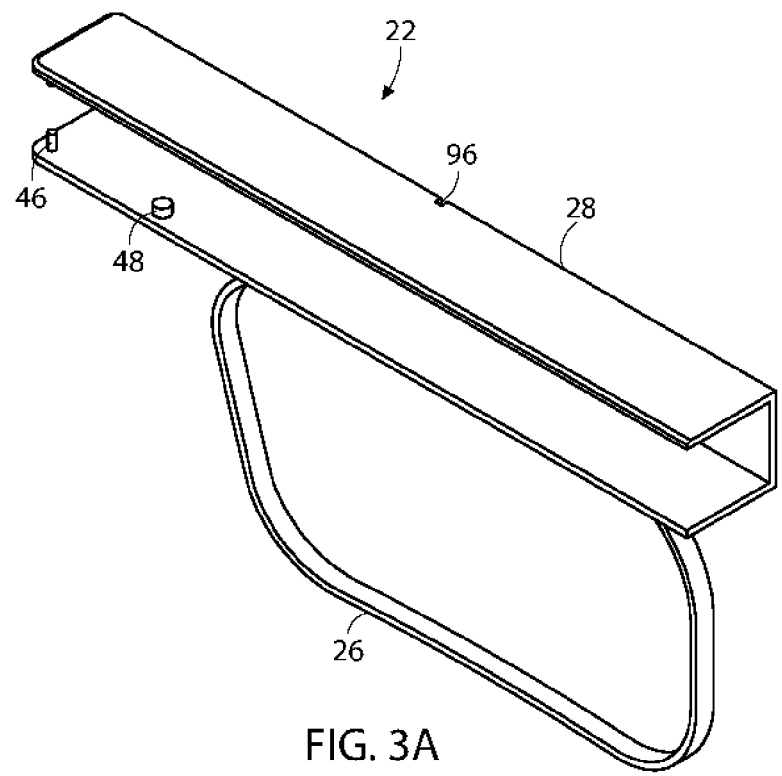
FIG. 3A is an upper rear perspective view of a first eyeglass portion of the eyeglass apparatus of FIGS. 1 and 2.

Reference numerals in the written specification and in the drawing figures indicate corresponding items.

DESCRIPTION OF THE PREFERRED EMBODIMENT

Referring first to FIGS. 1 and 2 of the drawings, an exemplary eyeglass apparatus of the present invention is generally indicated by reference numeral 20. The eyeglass apparatus 20 comprises a first eyeglass portion, generally indicated at 22, and a second eyeglass portion, generally indicated at 24. The first eyeglass portion 22 comprises a first lens portion 26 and a first connector portion 28. The second eyeglass portion 24 comprises a second lens portion 30 and a second connector portion 32. The first lens portion 26 is operatively coupled to the first connector portion 28 and is preferably fixed to the first connector portion such that the first lens portion and the first connector portion move as a single member. The second lens portion 30 is operatively coupled to the second connector portion 32 and is preferably fixed to the second connector portion such that the second lens portion and the second connector portion move as a single member. Preferably, the lens portions 26, 30 constitute corrective lens portions configured to correct impaired vision. More preferably the lens portions 26, 30 are configured to correct farsightedness or presbyopia. The lens portions 26, 30 may be convex lens portions (e.g., plano-convex, double-convex, or concavo-convex lenses). The first lens portion 26 includes a medial edge portion 34 and a lateral edge portion 36 generally opposite the medial edge portion 34. The second lens portion 30 includes a medial edge portion 38 and a lateral edge portion 40 generally opposite the medial edge portion 38.

The first and second connector portions 28, 32 of the first and second eyeglass portions 22, 24 are mechanically connected to one another in a manner permitting the eyeglass apparatus 20 to transition between a stowed configuration (shown in FIG. 1) and an extended configuration (shown in FIG. 2). The connection of the first and second connector portions 28, 32 is such that when the eyeglass apparatus 20 is in the stowed configuration: the first and second lens portions 26, 30 overlie one another; the medial edge portion 34 of the first lens portion is closer to the lateral edge portion 40 of the second lens portion than to the medial edge portion 38 of the second lens portion; and the lateral edge portion 36 of the first lens portion is closer to the medial edge portion 38 of the second lens portion than to the lateral edge portion 40 of the second lens portion. The connection of the first and second connector portions 28, 32 is such that when the eyeglass apparatus 20 is in the extended configuration, the first and second lens portions 26, 30 are in a non-overlying configuration with the medial edge portions 34, 38 of the first and second lens portions being between the lateral edge portion 36 of the first lens portion and the lateral edge portion 40 of the second lens portion.

Figure 3B:
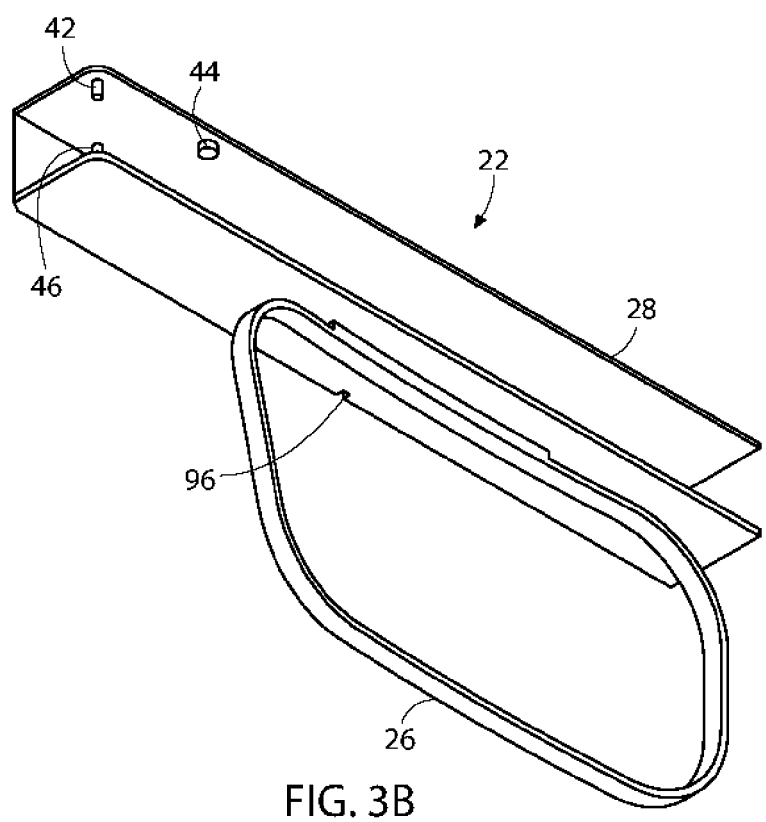
FIG. 3B is a lower rear perspective view of the first eyeglass portion of FIG. 3A.
Figure 3C:
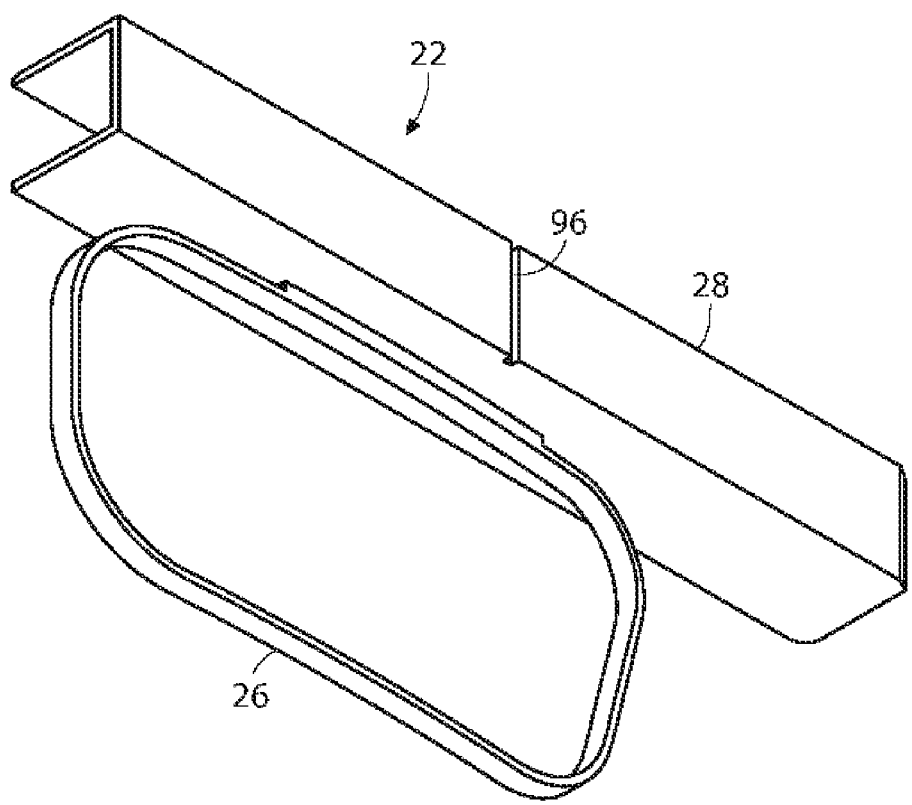
FIG. 3C is a lower front perspective view of the first eyeglass portion of FIGS. 3A and 3B.
Figure 4A:
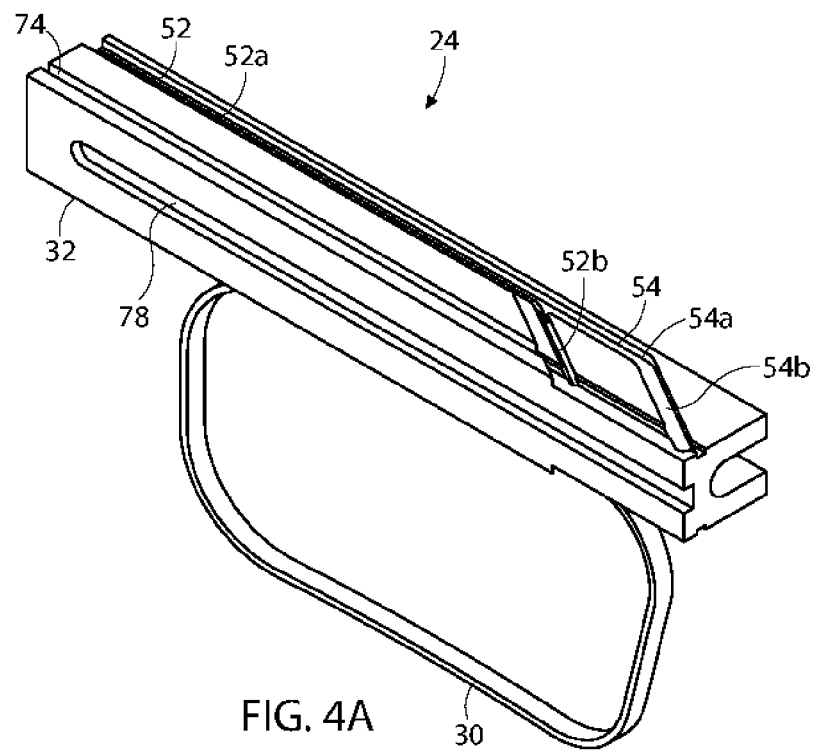
FIG. 4A is an upper rear perspective view of a second eyeglass portion of the eyeglass apparatus of FIGS. 1 and 2.
Figure 4B:
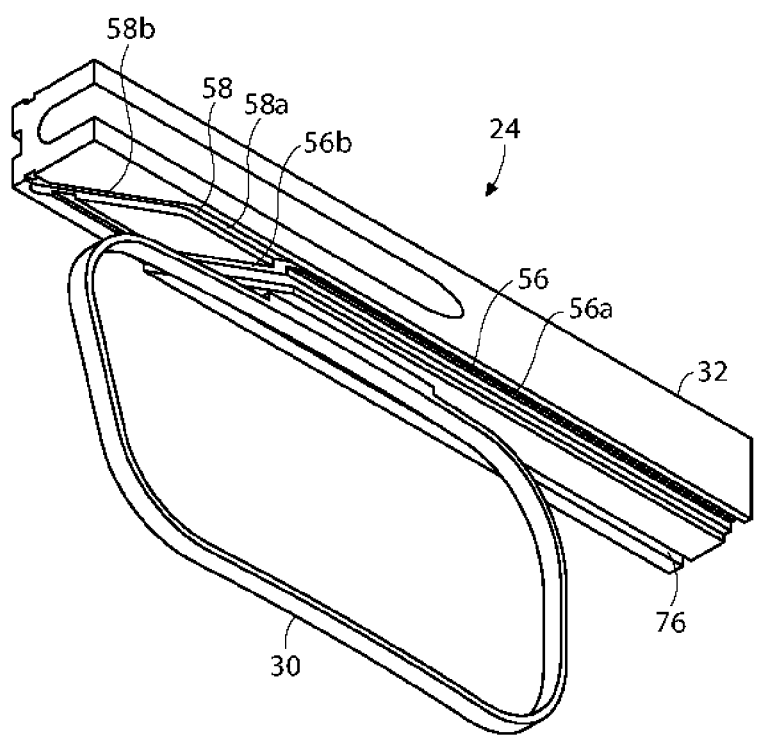
FIG. 4B is a lower front perspective view of the second eyeglass portion of FIG. 4A.
Figure 4C:
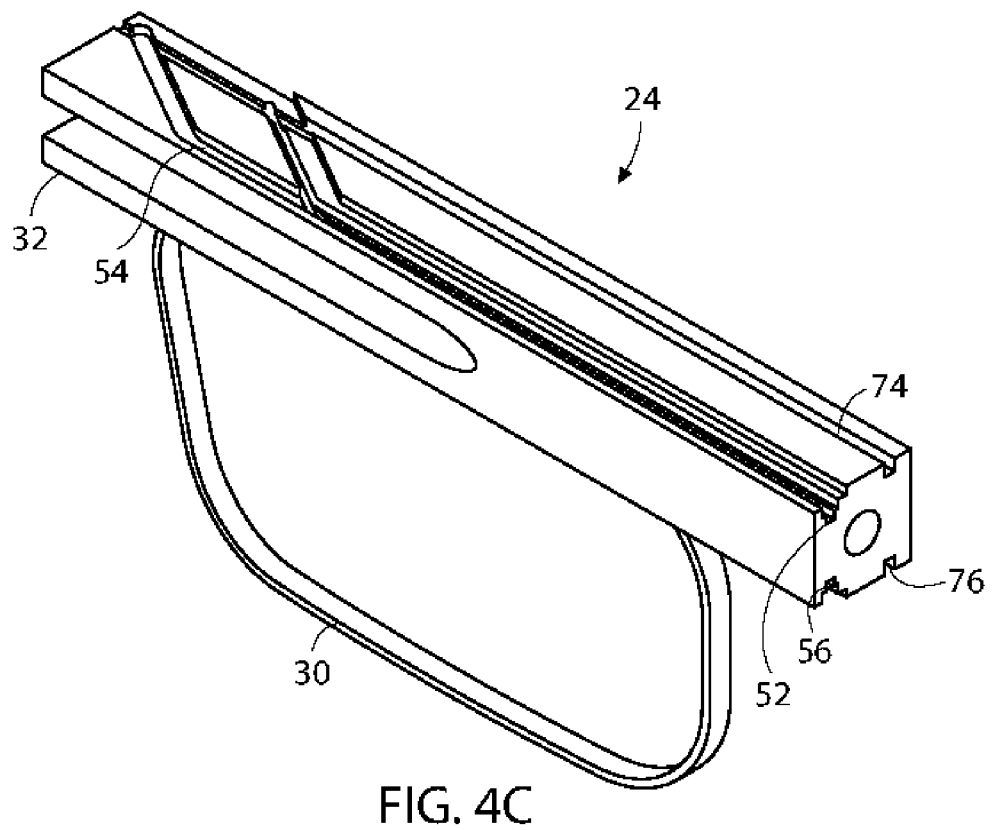
FIG. 4C is an upper front perspective view of the second eyeglass portion of FIGS. 4A and 4B.
Figure 4D:
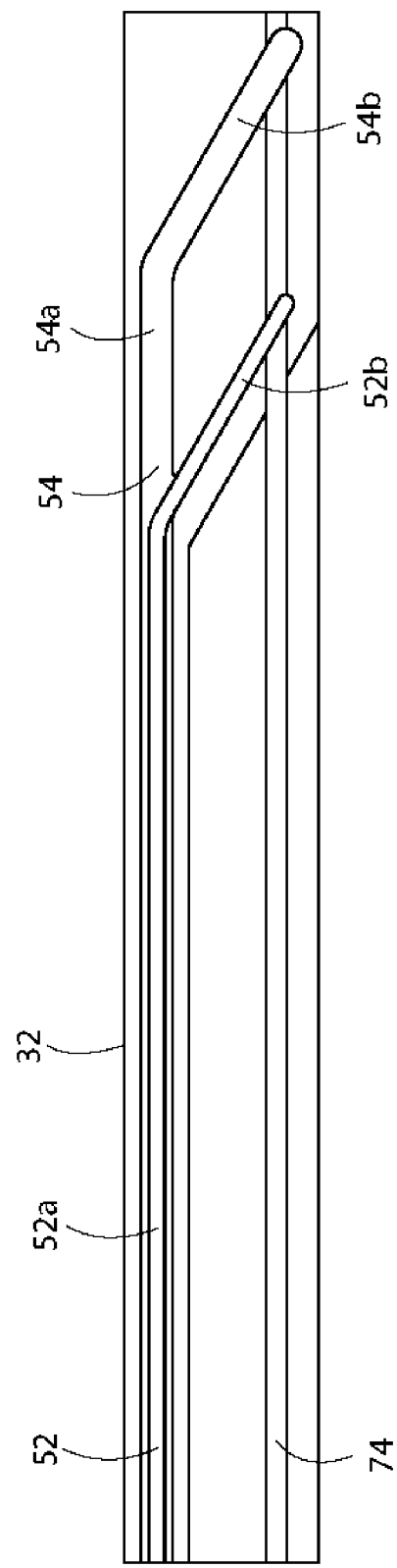
FIG. 4D is a top plan view of the second eyeglass portion of FIGS. 4A-4C.
Figure 5:
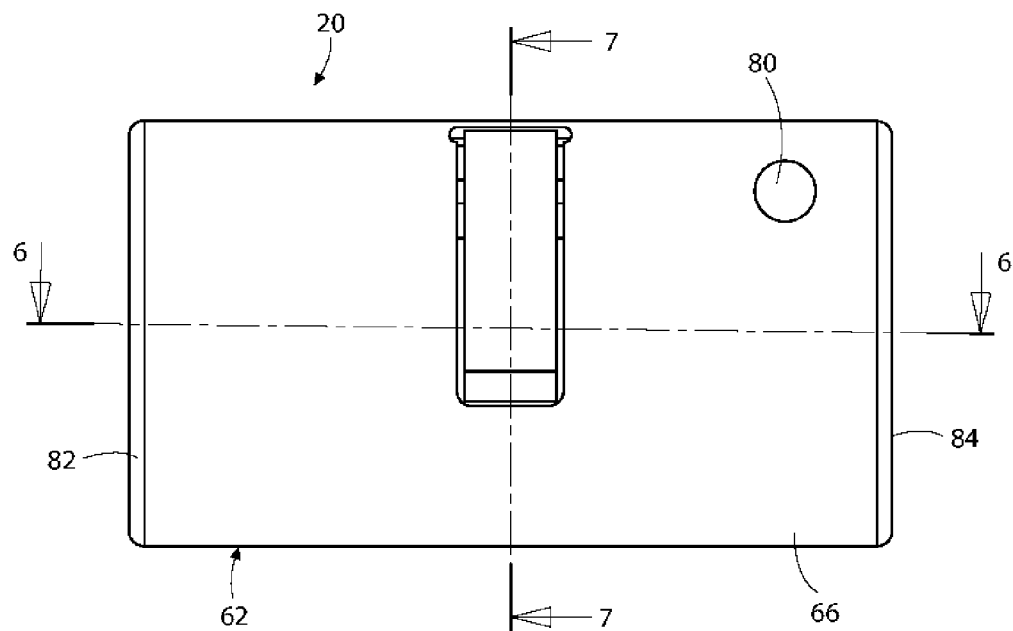
FIG. 5 is a rear elevational view of the eyeglass apparatus of FIG. 1, with the eyeglass apparatus in the stowed configuration.

In the preferred embodiment, the first and second connector portions 28, 32 are mechanically connected to one another via guide pins and guide channels. In particular and with reference to FIGS. 3A-3C, the first connector portion 28 includes first and second upper guide pins 42, 44, and first and second lower guide pins 46, 48. The first and second upper guide pins 42, 44 project downward from an upper portion of the first connector portion 28, and the first and second lower guide pins 46, 48 extend upward from a lower portion of the first connector portion. Referring to FIGS. 4A-4D, the second connector portion 32 includes first and second upper guide channels 52, 54 in a top surface of the second connector portion, and first and second lower guide channels 56, 58 in a bottom surface of the second connector portion. The guide pins and guide channels are shaped and configured such that as the eyeglass apparatus 20 transitions between the stowed configuration and the extended configuration, the first and second upper guide pins 42, 44 ride in the first and second upper guide channels 52, 54, respectively, and the first and second lower guide pins 46, 48 ride in the first and second lower guide channels 56, 58, respectively. In particular, the first upper guide pin 42 and the first lower guide pin 46 are longer and of a smaller diameter than the second upper guide pin 44 and the second lower guide pin 48, respectively. Likewise, the first upper guide channel 52 and the first lower guide channel 56 are deeper and narrower than the second upper guide channel 54 and the second lower guide channel 58, respectively. Each of the channels 52, 54, 56, 58 includes at least a laterally extending portion 52a, 54a, 56a, 58a, respectively, and an obliquely extending portion 52b, 54b, 56b, 58b, respectively. The laterally extending portions 52a, 54a, 56a, 58a are generally straight and generally parallel to one another. The obliquely extending portions 52b, 54b, 56b, 58b, are generally straight and generally parallel to one another. The corresponding obliquely extending portion and laterally extending portion of each channel form an oblique angle (e.g., 150□).

Figure 6:
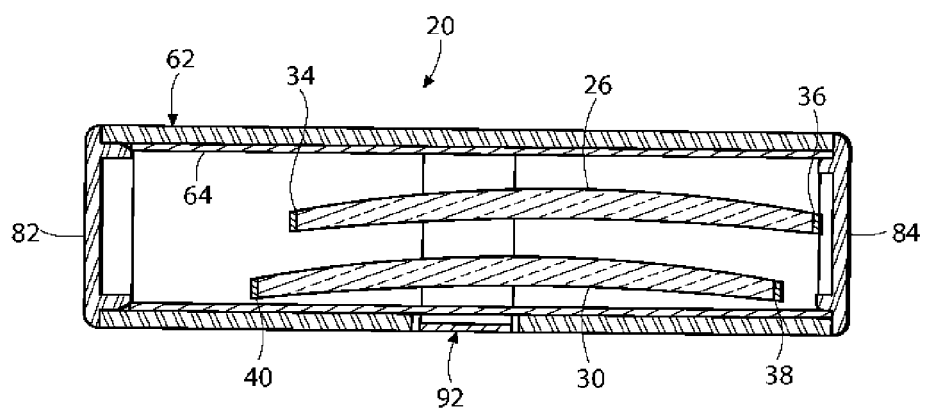
FIG. 6 is a cross-sectional view of the eyeglass apparatus of FIG. 1 taken along the plane of line 6-6 of FIG. 5.

Referring to FIGS. 5-8, when the eyeglass apparatus 20 is in the stowed configuration the first and second lens portions 26, 30 overlie one another. In this embodiment, the first lens portion 26 overlaps the second lens portion 30 when the eyeglass apparatus 20 is in the stowed configuration. In other words, the first and second lens portions 26, 30 are not laterally aligned when the eyeglass apparatus 20 is in the stowed configuration. But it is to be understood that an alternative eyeglass apparatus could be configured such that the first and second lens portions laterally align when the alternative eyeglass apparatus is in its stowed configuration without departing from the scope of the invention. Referring to FIG. 6, when the eyeglass apparatus 20 is in the stowed configuration: the medial edge portion 34 of the first lens portion 26 is closer to the lateral edge portion 40 of the second lens portion 30 than to the medial edge portion 38 of the second lens portion; and the lateral edge portion 36 of the first lens portion 26 is closer to the medial edge portion 38 of the second lens portion 30 than to the lateral edge portion 40 of the second lens portion.

Figure 7:
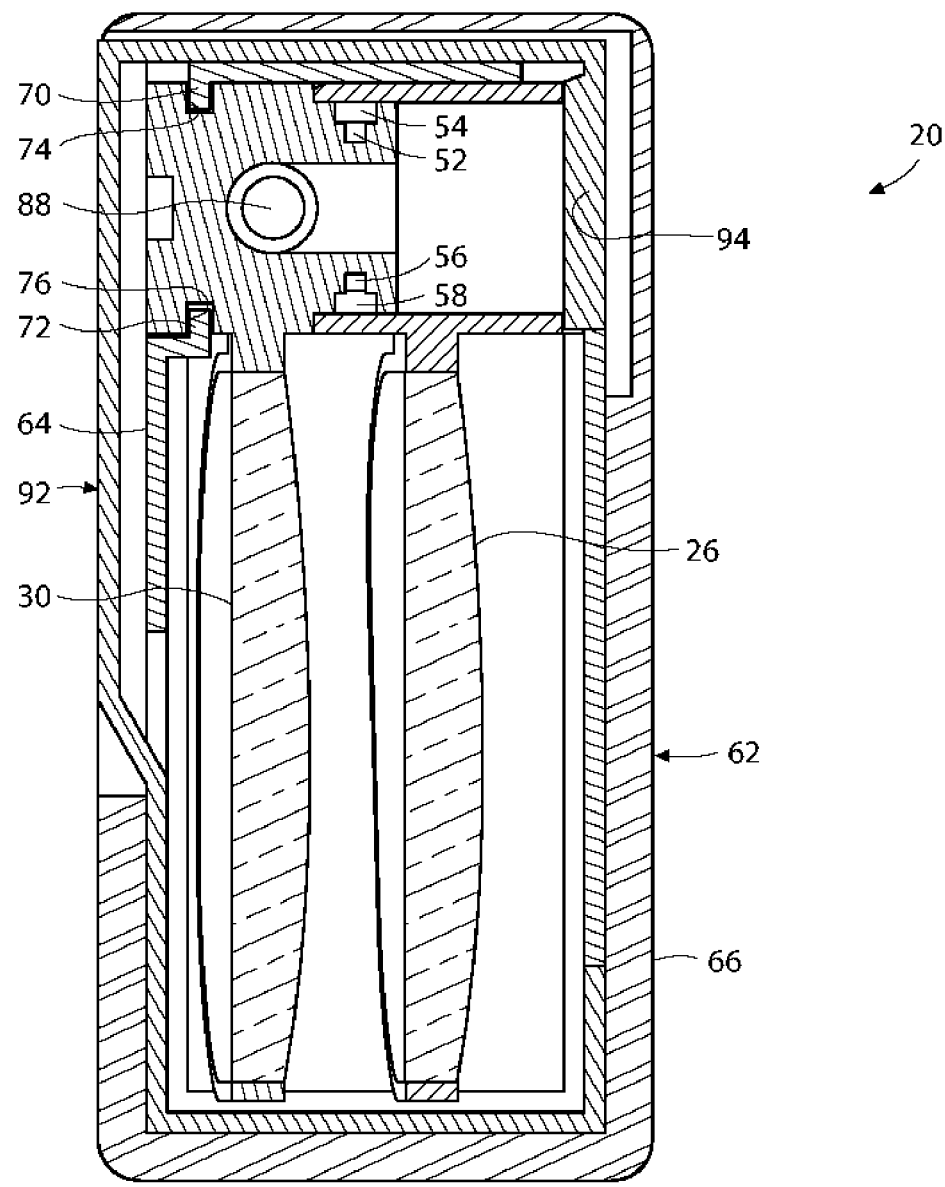
FIG. 7 is a cross-sectional view of the eyeglass apparatus of FIG. 1 taken along the plane of line 7-7 of FIG. 5, the eyeglass apparatus being shown with a locking mechanism in a locked position.
Figure 8:
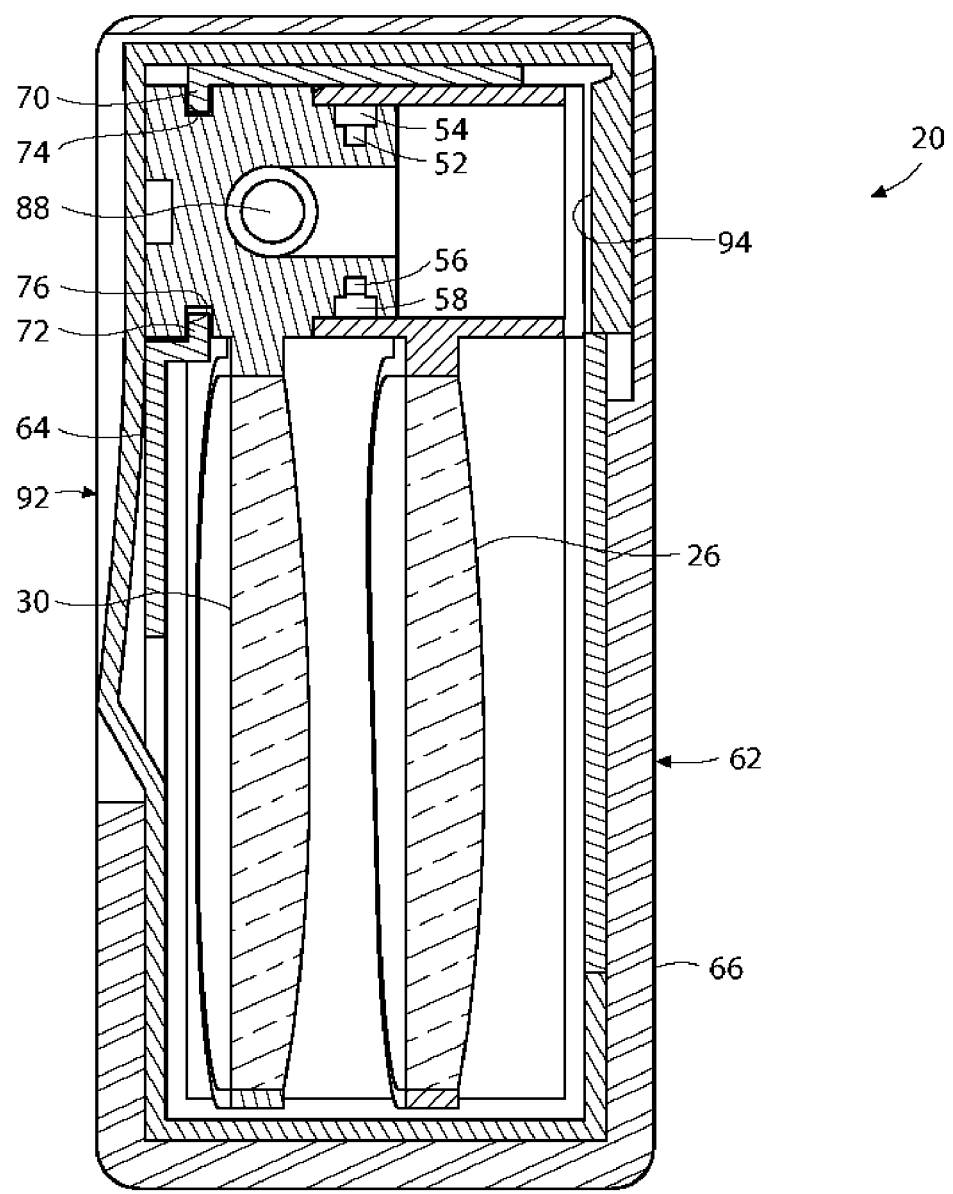
FIG. 8 is a cross-sectional view similar to that of FIG. 7 but shown with the locking mechanism in an unlocked position.
Figure 9A:
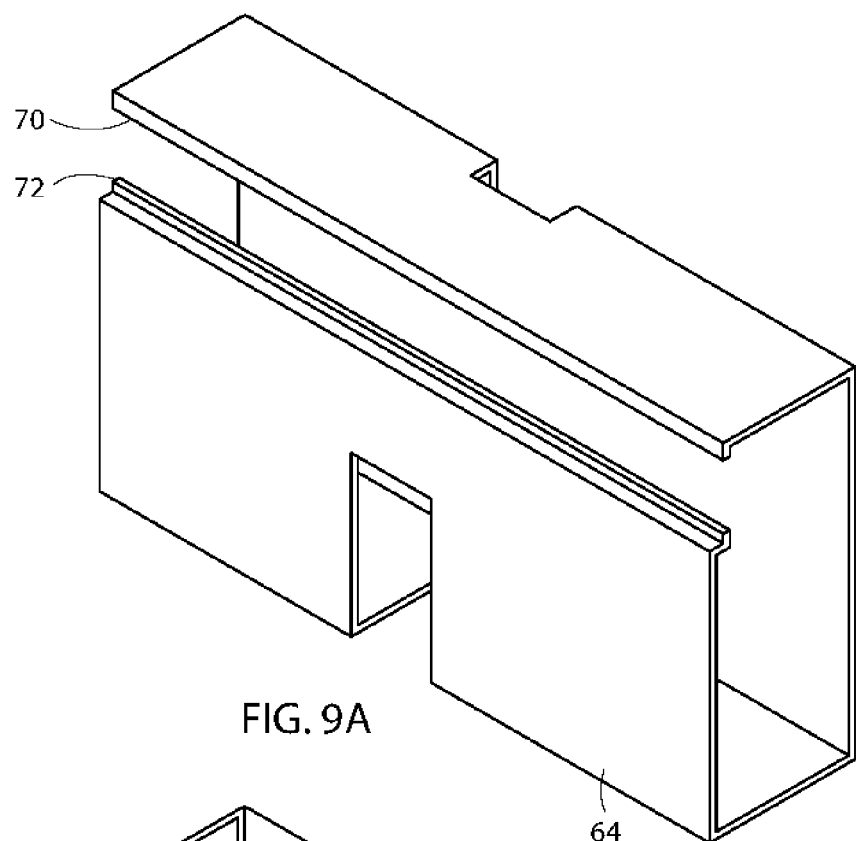
FIG. 9A is an upper rear perspective view of a housing sleeve insert of a housing of the eyeglass apparatus of FIG. 1.
Figure 9B:
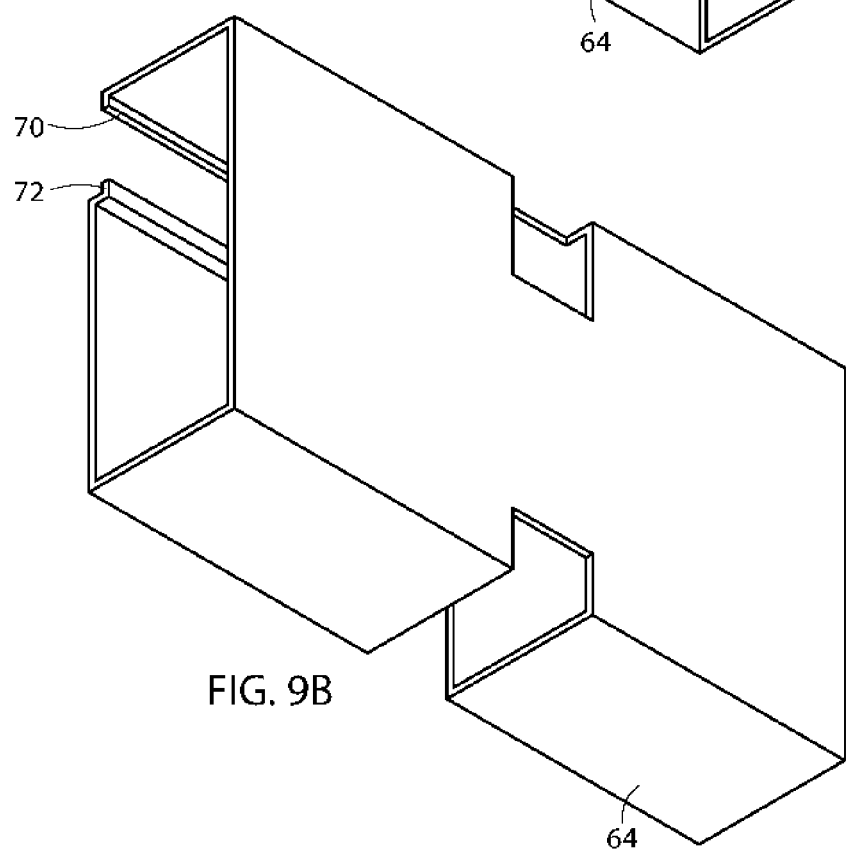
FIG. 9B is a lower front perspective view of the housing sleeve insert of FIG. 9A.
Figure 10:
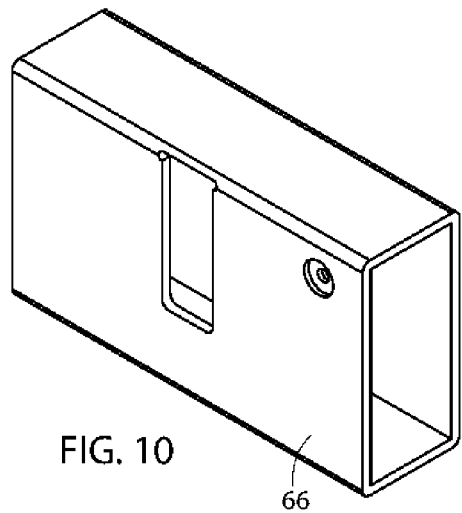
FIG. 10 is a front perspective view of a housing shell of the housing of the eyeglass apparatus of FIG. 1.
Figure 11:
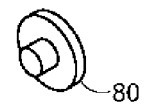
FIG. 11 is a perspective view of a stop pin of the eyeglass apparatus of FIG. 1.
Figure 12:
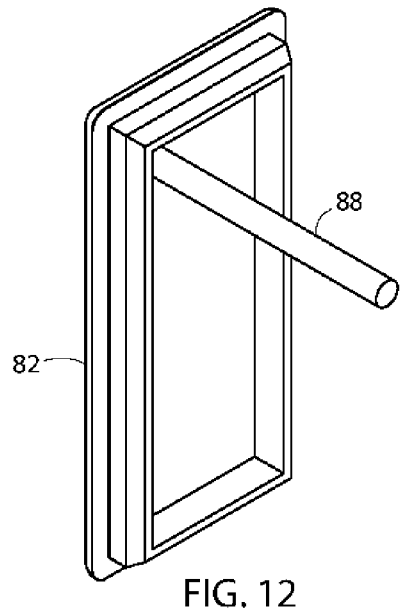
FIG. 12 is a perspective view of a left cap of the eyeglass apparatus of FIG. 1.
Figure 13:
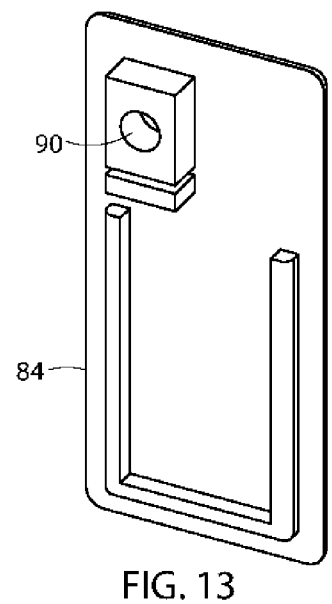
FIG. 13 is a perspective view of a right cap of the eyeglass apparatus of FIG. 1.
Figure 14A:
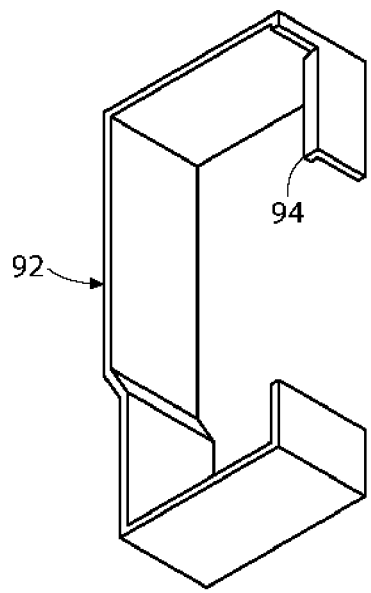
FIG. 14A is a lower front perspective view of a lock mechanism of the eyeglass apparatus of FIG. 1.
Figure 14B:
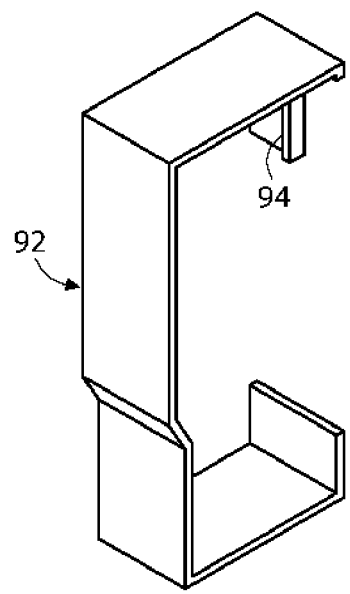
FIG. 14B is an upper rear perspective view of a the lock mechanism of FIG. 14B.
Figure 15:
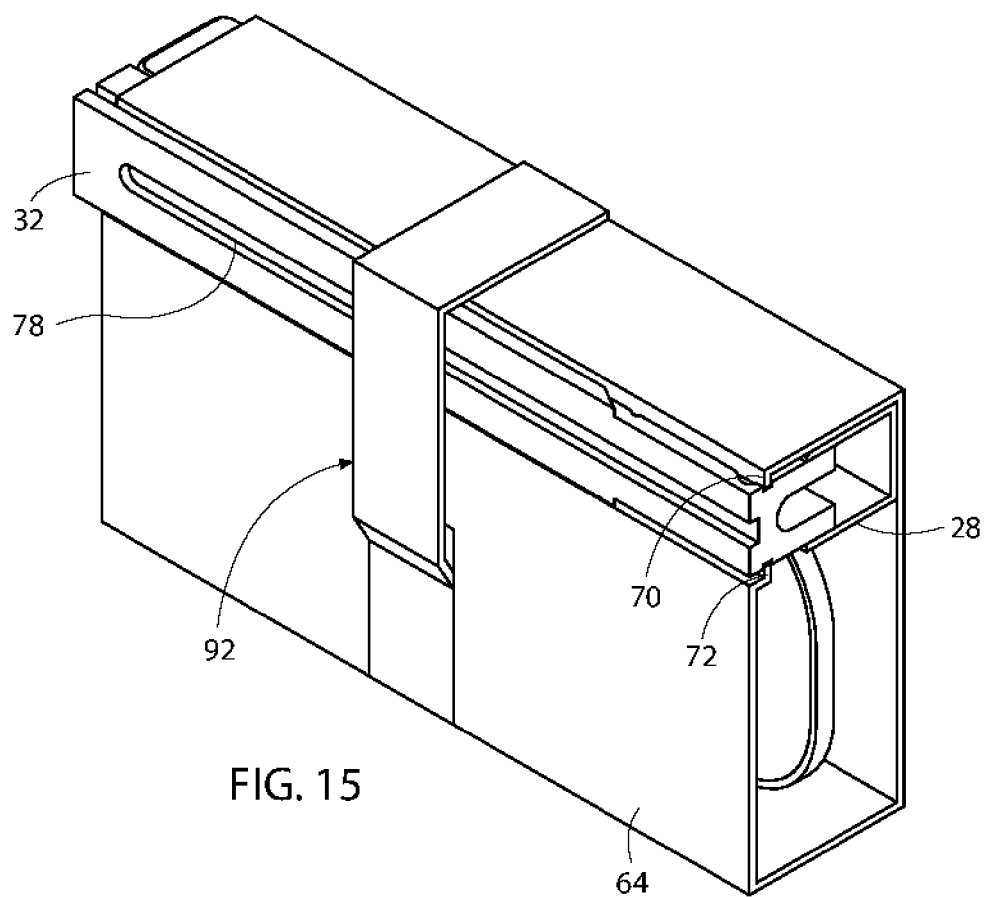
FIG. 15 is a perspective view of the eyeglass apparatus of FIG. 1 in the stowed configuration and is similar to FIG. 1 except the eyeglass apparatus is shown in FIG. 15 without the housing shell, left cap and right cap.

Because of the guide pins and guide channels, the first eyeglass portion 22 and its corresponding first lens portion 26 serially moves at least in a first direction (e.g., in a lateral direction) and then in a second direction (e.g., in an oblique or slanted direction) relative to the second eyeglass portion 24 and its corresponding second lens portion 28 as the eyeglass apparatus transitions from the stowed configuration to the extended configuration. Because the laterally extending portions 52a, 54a, 56a, 58a, are straight and because the obliquely extending portion 52b, 54b, 56b, 58b are straight, the first eyeglass portion 22 moves at least along a first axis, e.g., a lateral axis X1 (FIG. 1), and then along a second axis (e.g., an oblique axis X2) as the eyeglass apparatus 20 transitions from the stowed configuration to the extended configuration. Although a precise mechanism and a precise motion is described in connection with the preferred embodiment, it is to be understood that some alternative mechanism that results in a similar or different motion could be employed without departing from the scope of the invention as set forth in the below claims. As shown in FIGS. 6-8, the first lens portion 26 is forward of the second lens portion 30 when the eyeglass apparatus 20 is in the stowed configuration. As the first lens portion 26 moves toward the extended position along the oblique axis X2—i.e., as the guide pins 42, 44, 46, 48 of the first connector portion 28 ride along the obliquely extending portions 52b, 54b, 56b, 58b of the guide channels 52, 54, 56, 58—the first lens portion 26 moves rearward relative to the second lens portion 30 until the first lens portion is generally aligned with the second lens portion. As shown in FIG. 2, when the eyeglass apparatus 20 is in the extended configuration the first and second lens portions are in a non-overlying configuration with the medial edge portions 34, 38 of the first and second lens portions 26, 30 being between the lateral edge portion 36 of the first lens portion 26 and the lateral edge portion 40 of the second lens portion 30. The eyeglass apparatus 20 is configured such that when the eyeglass apparatus is in the extended configuration the medial portions 34, 38 of the first and second lens portions 26, 30 are spaced to define a nose-receiving region 60 between the medial portions (see FIG. 2).

The eyeglass apparatus 20 also includes a housing, generally indicated at 62, shaped and configured to encase the first and second lens portions 26, 30 when the eyeglass apparatus is in the stowed configuration. The housing 62 includes a housing sleeve insert 64 and a housing shell 66 surrounding the housing sleeve insert. The housing sleeve insert 64 includes upper and lower guide tabs 70, 72. The second connector portion 32 of the second eyeglass portion 24 includes upper and lower guide slots 74, 76 adapted for receiving the first and second guide tabs 70, 72, respectively. The second connector portion 32 rides along the guide tabs 70, 72 of the housing sleeve insert 64 as the second eyeglass portion 24 moves relative to the housing 62 between the stowed configuration (FIGS. 1, 5-8) and the extended configuration (FIG. 2). The second connector portion 32 further includes a limit slot 78 in a rearward facing surface of the second connector portion. The eyeglass apparatus 20 further includes a stop pin 80 extending from the housing shell 66 into the limit slot 78. When the eyeglass apparatus 20 is in the extended configuration, the stop pin 80 engages the second connector portion 32 at an end of the limit slot 78 (e.g., the left most end of the slot as viewed in FIG. 4A) to prevent the second connector portion from disconnecting from the housing sleeve insert 64.

The eyeglass apparatus 20 further includes a left cap 82 and a right cap 84. The left cap 82 is fixed to an end (left end as viewed in FIGS. 5 and 6) of the housing shell 66 of the housing 62. The right cap 84 is fixed to an end of the first connector portion 28 of the first eyeglass portion 22. The right cap 84 covers an end (right end as viewed in FIGS. 5 and 6) of the housing shell 66 when the eyeglass apparatus 20 is in the stowed configuration. The eyeglass apparatus 20 also includes a spring 86 or other suitable biasing member for urging the eyeglass apparatus 20 toward the extended configuration. The spring 86 may be a helical spring such as a spring-tempered steel compression spring of the type commercially available from McMaster-Carr, part number 9662K12 (cut to a suitable length). The left cap 82 includes a stem 88 for holding a left end of the spring 86. The right cap 84 includes a bore 90 in the right cap 84 for holding a right end of the spring 86.

The eyeglass apparatus 20 further includes a lock mechanism 92. The lock mechanism 92 is a generally C-shaped member having a lower portion sized to fit within a slot in the housing sleeve insert 64. As shown in FIGS. 6-8, the lower portion of the lock mechanism 92 is generally flush with the housing sleeve insert 64 and sufficiently snug within the housing shell 66 such that the lower portion of the lock mechanism 92 is generally fixed relative to the housing sleeve insert and the housing shell. An upper portion of the lock mechanism 92 is resiliently moveable between a locked position (FIG. 7) and an unlocked position (FIG. 8). The upper portion of the lock mechanism 92 includes a locking tab 94 sized and shaped to selectively interlock in a locking groove 96 in a forward facing surface of the first connector portion 28. The lock mechanism 92 is shaped such that it is biased toward the locked position. When the eyeglass apparatus 20 is in the stowed configuration and the lock mechanism 92 is in the locked position, the locking tab 94 extends into the locking groove 96 and counteracts the biasing force of the spring 86 to lock the eyeglass apparatus in the stowed configuration.

To use the eyeglass apparatus 22, an individual presses against a rearward facing surface of the upper portion of the lock mechanism 92 to resiliently move the upper portion to the unlocked position to thereby disengage the locking tab 94 from the locking groove 96. Upon the disengagement of the locking tab 94 from the locking groove 96, the spring 86 urges the first eyeglass portion 22 laterally away from the housing 62 until the end of the limit slot 78 of the second connector portion 32 abuts the stop pin 80, thereby transitioning the eyeglass apparatus 20 to the extended configuration. When in the extended position, the eyeglass apparatus 20 may be positioned near the eyes of the individual to enable the individual to simultaneously look through the first lens portion 26 with one of the individual's eyes and look through the second lens portion 30 with the other of the individual's eyes. To transition the eyeglass apparatus 22 from the extended configuration to the stowed configuration, the right cap 84 may be pushed laterally until the right cap is adjacent the end of the housing. As the locking groove 96 of the lock mechanism 92 aligns with the locking tab 94, the biasing of the lock mechanism urges the locking tab into the groove and to the locked position to retain the eyeglass apparatus 20 in the stowed configuration.

In view of the foregoing, it should be appreciated that the invention achieves several advantages over prior art eyeglass mechanisms.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. An eyeglass apparatus comprising a first eyeglass portion and a second eyeglass portion, the first eyeglass portion comprising a first lens portion and a first connector portion operatively coupled to the first lens portion, the second eyeglass portion comprising a second lens portion and a second connector portion operatively coupled to the second lens portion, each of the first and second lens portions including a medial edge portion, a lateral edge portion, and a first face, the first and second connector portions being mechanically connected to one another in a manner permitting the eyeglass apparatus to transition between a stowed configuration and an extended configuration, the first and second connector portions being connected together in a manner such that when the eyeglass apparatus is in the stowed configuration the first and second lens portions overlie one another, the medial edge portion of the first lens portion being closer to the lateral edge portion of the second lens portion than to the medial edge portion of the second lens portion when the eyeglass apparatus is in the stowed configuration, the lateral edge portion of the first lens portion being closer to the medial edge portion of the second lens portion than to the lateral edge portion of the second lens portion when the eyeglass apparatus is in the stowed configuration, the first and second connector portions being connected together in a manner such that when the eyeglass apparatus is in the extended configuration the first and second lens portions are in a non-overlying configuration with the medial edge portions of the first and second lens portions being between the lateral edge portion of the first lens portion and the lateral edge portion of the second lens portion, the first faces of the first and second lens portions facing in same general direction when the eyeglass apparatus is in the stowed configuration and when the eyeglass apparatus is in the extended configuration, the first and second connector portions being mechanically connected to one another in a manner such that:

the first lens portion is forward of the second lens portion when the eyeglass apparatus is in the stowed configuration;

at least one of the first and second lens portions moves laterally as the eyeglass apparatus transitions between the stowed and extended configurations; and at least one of the following occurs as the eyeglass apparatus transitions from the stowed configuration to the extended configuration: (a) the first lens portion moves rearward relative to the second lens portion; and (b) the second lens portion moves forward relative to the first lens portion.

2. An eyeglass apparatus as set forth in claim 1 wherein the first and second connector portions mechanically cooperate with each other such that when the eyeglass apparatus is in the extended configuration the medial portions of the first and second lens portions are spaced to define a nose-receiving region therebetween.

3. An eyeglass apparatus as set forth in claim 2 further comprising a lock mechanism movable between a locked position and an unlocked position relative to the housing, the lock mechanism being configured to retain the eyeglass apparatus in the stowed configuration when the lock mechanism is in the locked position, the lock mechanism being configured to permit the eyeglass apparatus to transition from the stowed configuration to the locked position when the lock mechanism is in the unlocked position.

4. An eyeglass apparatus as set forth in claim 1 further comprising a housing shaped and configured to encase the first and second lens portions when the eyeglass apparatus is in the stowed configuration.

5. An eyeglass apparatus as set forth in claim 4 wherein the housing is operatively coupled to at least one of the first and second eyeglass portions for movement of the first and second lens portions relative to the housing as the eyeglass apparatus transitions between the stowed and extended configurations.

6. An eyeglass apparatus as set forth in claim 5 further comprising at least one biasing member urging the eyeglass apparatus toward the extended configuration.

7. An eyeglass apparatus as set forth in claim 6 further comprising a lock mechanism movable between a locked position and an unlocked position relative to the housing, the lock mechanism being configured to retain the eyeglass apparatus in the stowed configuration when the lock mechanism is in the locked position, the lock mechanism being configured to permit the eyeglass apparatus to transition from the stowed configuration to the locked position when the lock mechanism is in the unlocked position.

8. An eyeglass apparatus as set forth in claim 1 wherein the first and second lens portions constitute corrective lens portions configured to correct impaired vision.

9. An eyeglass apparatus as set forth in claim 8 wherein the corrective lens portions are configured to correct farsightedness.

10. An eyeglass apparatus as set forth in claim 1 wherein the first and second connector portions mechanically cooperate with each other such that one of the first and second lens portions serially moves at least in a first direction and then in a second direction relative to the other of the first and second lens portions as the eyeglass apparatus transitions from the stowed configuration to the extended configuration, the first direction being different from the second direction.

11. An eyeglass apparatus as set forth in claim 1 wherein the first and second connector portions mechanically cooperate with each other such that one of the first and second lens portions moves at least along a first axis and then along a second axis relative to the other of the first and second lens portions as the eyeglass apparatus transitions from the stowed configuration to the extended configuration, the second axis being oblique relative to the first axis.

12. An eyeglass apparatus as set forth in claim 1 further comprising at least one biasing member urging the eyeglass apparatus toward the extended configuration.

13. An eyeglass apparatus as set forth in claim 12 wherein the first and second connector portions mechanically cooperate with each other such that when the eyeglass apparatus is in the extended configuration the medial portions of the first and second lens portions are spaced to define a nose-receiving region therebetween.

14. An eyeglass apparatus as set forth in claim 13 further comprising a lock mechanism movable between a locked position and an unlocked position relative to the housing, the lock mechanism being configured to retain the eyeglass apparatus in the stowed configuration when the lock mechanism is in the locked position, the lock mechanism being configured to permit the eyeglass apparatus to transition from the stowed configuration to the locked position when the lock mechanism is in the unlocked position.

15. An eyeglass apparatus as set forth in claim 12 further comprising a lock mechanism movable between a locked position and an unlocked position relative to the housing, the lock mechanism being configured to retain the eyeglass apparatus in the stowed configuration when the lock mechanism is in the locked position, the lock mechanism being configured to permit the eyeglass apparatus to transition from the stowed configuration to the locked position when the lock mechanism is in the unlocked position.

* * * * *